United States Patent

[11] 3,578,359

[72] Inventors James E. Smith;
Carl W. Schulz, Lancaster, Ohio
[21] Appl. No. 855,271
[22] Filed Sept. 4, 1969
[45] Patented May 11, 1971
[73] Assignee Diamond Power Specialty Corporation

[54] RIGID REFLECTIVE HEAT INSULATION
4 Claims, 3 Drawing Figs.
[52] U.S. Cl. .................................................... 285/47, 285/189
[51] Int. Cl. ...................................................... F16l 59/14
[50] Field of Search ........................................... 285/47, 48, 224, 189; 138/109, 148, 146 (Cursory)

[56] References Cited
UNITED STATES PATENTS
2,405,330 8/1946 Ryder ........................... 138/146
2,656,201 10/1953 Swerdlow et al .............. 285/224X
2,761,949 9/1956 Colton .......................... 285/189X
2,937,662 5/1960 Green ........................... 138/148X Primary Examiner—Thomas F. Callaghan
Attorney—Harness, Dickey & Pierce ABSTRACT: Sectional prefabricated thermal insulating elements for projecting portions of large structures having inaccurately positioned components, such as the nozzles of reactor vessels, are formed in semicylindrical parts of different diameters held together against longitudinal separation by overlapping sheet metal parts which permit them to move transversely of each other and of the longitudinal axis. The parts are buckled together and separable both longitudinally and transversely of the axis.

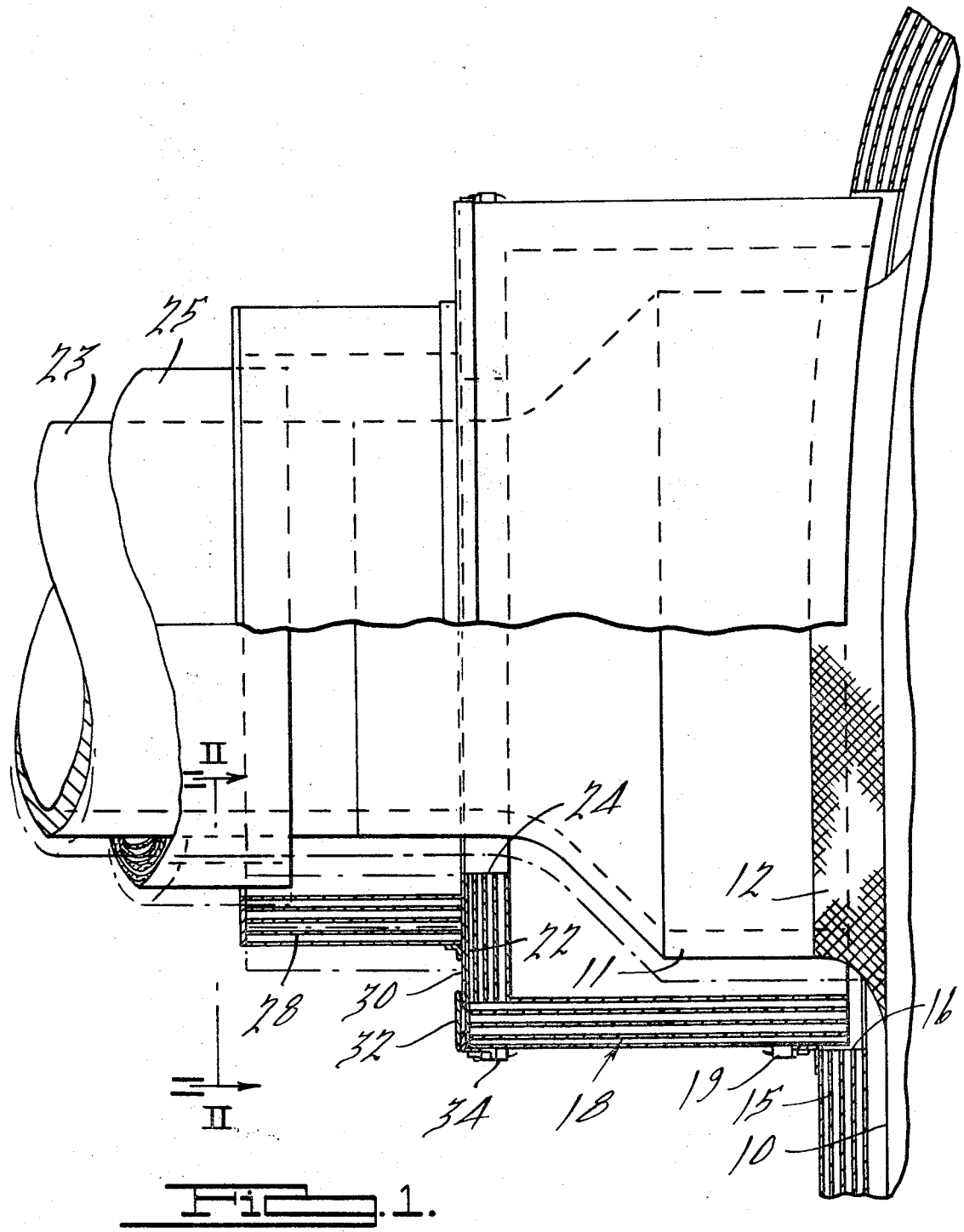

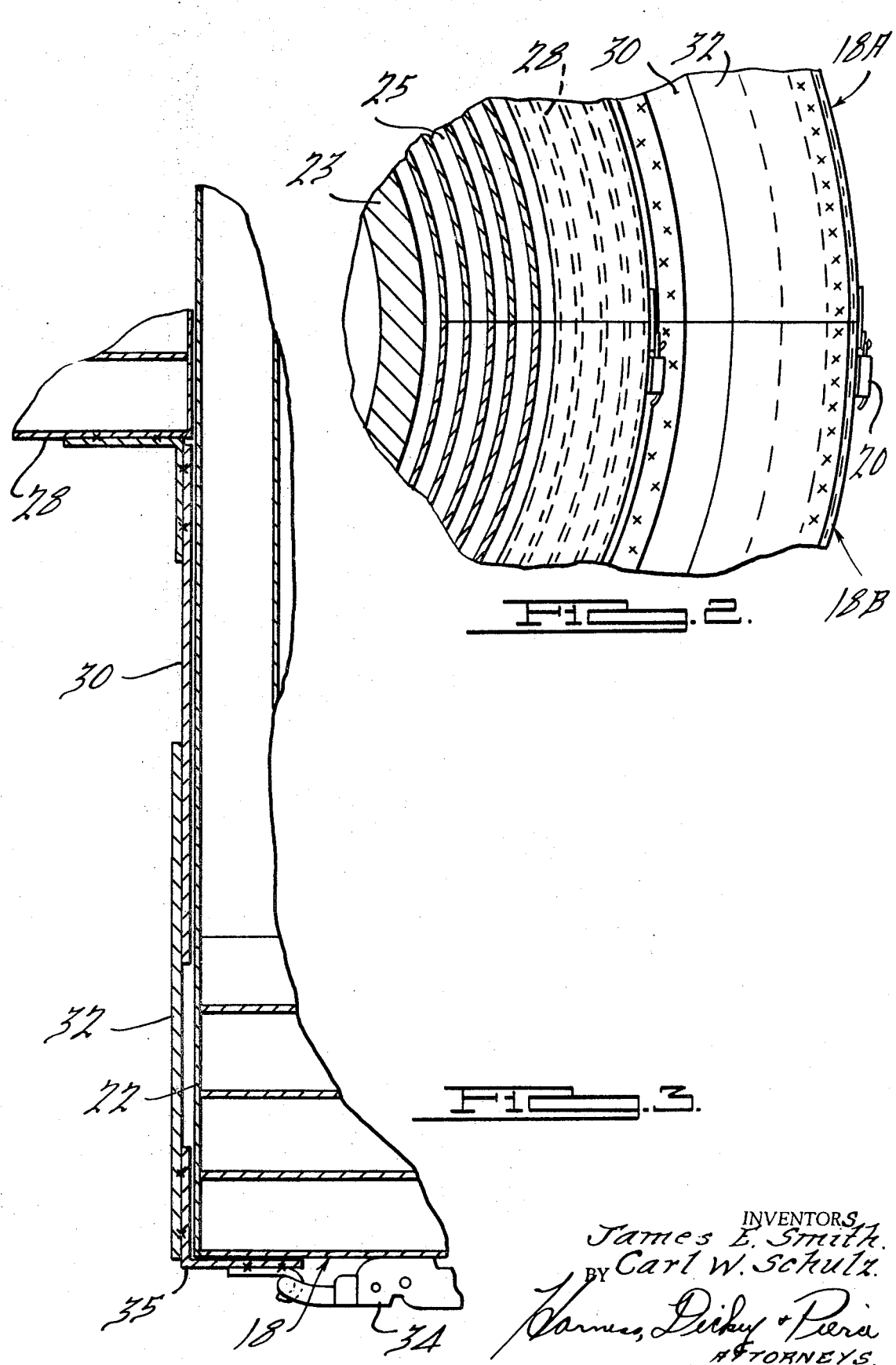

RIGID REFLECTIVE HEAT INSULATION

BACKGROUND OF THE INVENTION

In the construction of large fabrications having parts welded in situ by arc welding or the like, such as reactor vessels having connections, nozzles, and other attachments, where it is desired to cover the entire assembly, including such attachments, with prefabricated rigid thermal insulation of the type disclosed in the U.S. patents to Gronemeyer, U.S. Pat. Nos. 2,841,203 and 3,028,278, severe problems have been encountered in attempting to fit such prefabricated insulation components to the finished vessel and to the attachments thereto, because of the practical impossibility of fabricating the assembly in situ in exact conformity to the theoretical prescribed designs and dimensions. It has been found in the past that the premanufactured insulation components must frequently be altered, or their manufacture must be delayed, pending completion of the structure to be insulated, thereby introducing delay in the completion of the entire installation.

The present invention aims to overcome the problem referred to by relatively simple and inexpensive modifications of the design of the prefabricated reflective insulating components used at the junctures of relatively large and small parts of the structure to be insulated, while nevertheless preserving all of the advantages of the type of rigid reflective insulation referred to.

Other objects and advantages will become apparent upon consideration of the present disclosure in its entirety.

BRIEF DESCRIPTION OF THE FIGURES OF DRAWING

FIG. 1 is a view principally in diametric longitudinal section, but with certain parts shown in elevation, and partly in diagrammatic form, showing thermal insulating components constructed in accordance with the present invention installed upon a nozzle and adjacent portions of a reactor vessel;

FIG. 2 is a fragmentary front elevational view, partly in section, taken substantially as indicated by the line and arrows II–II of FIG. 1, and looking in the direction of the arrows; and FIG. 3 is an enlarged detailed sectional view of slip joint structure incorporated in the apparatus.

DETAILED DESCRIPTION OF PREFERRED FORM OF THE INVENTION

Reference character 10 designates generally a reactor vessel shown as having projecting from its surface a nozzle 11 secured thereto in the welded area 12. Such a reactor vessel of the character in question might be 18 or 20 feet in diameter, and such nozzles might be of diameters ranging between a few inches and 3 feet. Although the engineering design might call for the dimensions and positioning of the vessel and nozzles to accuracies of relatively small fractions of an inch, it has been found in practice that the location or positioning may ultimately vary as much as 2 inches from nominal. Since the prefabricated insulation must be manufactured to much closer tolerances than this, it has not been feasible to premanufacture insulating components of the indicated type for such areas of reactor vessels, while subsequent manufacture thereof of course necessarily entails delay in the completion of the entire installation.

In accordance with the present invention and as shown in FIG. 1 the reflective lagging 15 which insulates the main body of the reactor vessel 10 is provided with an opening 16 surrounding the nozzle 11, which opening is enough larger than the nozzle so that even if the positioning and/or angularity of the nozzle differ from nominal to the maximum extent encountered in practical construction, sufficient clearance will remain entirely around the nozzle, between the nozzle and the opening 16, to receive the cylindrical end of the sleeve 18 of a nozzle cover insulating assembly. Sleeve 18 covers the larger portion of the nozzle adjacent the vessel, telescopes partially into the opening 16 and is releasably secured to the main insulating jacket 15 by buckles 19. As shown in FIG. 2, sleeve 18 is formed in two mating sections 18A and 18B secured together along their diametric plane of separation by releasable buckles 20. Sleeve 18 extends outwardly from the vessel far enough to partially overlie the pipe 23 which extends outwardly from the nozzle, and the sections of the sleeve are formed with complemental flat flange portions defining an outer wall 22, the opening 24 in wall 22 substantially exceeding the pipe diameter to allow for displacement of the nozzle and pipe.

Reference character 25 designates generally the complemental semicylindrical lagging units employed to cover the pipe and which are preferably constructed in accordance with Gronemeyer patents, U.S. Pat. Nos. 2,841,203 and 3,028,278. An extension sleeve 28 projecting from the outer wall 22 of the larger inner sleeve 18 is also of cylindrical construction and of an internal diameter slightly exceeding the outside diameter of the pipe lagging assembly 25, assembly 25 being telescoped into sleeve 28 to provide a continuous insulating cover. At its vessel end, the sleeve 28 has a flat end wall which abuts the outside of end wall flange 22, to which it is held in close abutting relation by means, best shown in FIG. 3, so designed as to permit sleeve 28 and lagging 25 to be shifted laterally as may be required to conform to mispositioning of the nozzle axis.

The sleeve 28 is preferably also formed in two sections separable on a diametric plane and releasably buckled together like the other components referred to above, and in similar fashion can be considered as a unit for present purposes. At its vessel end, a relatively thin flat sheet metal flange 30 is secured to each section of the sleeve 28, positioned to lie closely against the outer flange wall 22, and the latter wall carries retaining ring portions 32 secured thereto, extending radially inwardly from the periphery of the cover 18 parallel to flange portions 30 and closely overlying the latter. Retaining flanges 32 are preferably removably secured to cover 18 by buckles 34 and angle brackets 35. Ring portions 32 extend inwardly from the periphery only part way over the retaining flange portions 30, the opening defined by the inner edge portions of ring portions 32 being large enough to permit lateral displacement of sleeve 28 to the extent required, while due to the close overlapping relationship, the sleeve 28 is held against axial movement away from cover portion 18.

In the event that disassembly becomes necessary, release of the buckles 19 permits the cover assembly comprising sections 18 and 28 to move away from the vessel and free of the confining effect of the opening 16, whereafter the sections may be separated and removed by releasing their buckle means as at 20.

We claim:

1. Rigid preformed lagging means for angularly intersecting areas of interrelated structural components which require uninterrupted thermal insulation, wherein one component projects from the surface of the other and said projecting component is of relatively small cross section as compared to the intersected surface area of the other, characterized by a rigid insulating sheath on said intersected surface area and having an opening therein substantially larger than the entire area which all mispositioned placements of the projecting component would occupy, a rigid tubular insulating cover fitted relatively accurately to said sheath at the opening and projecting therefrom around said projecting component for a portion of the length of the latter and having an internal diameter substantially exceeding the outside diameter of the projecting component, tubular lagging of smaller cross section fitted on said projecting component and extending farther from said surface area than said cover, an insulating connector fitted closely on said tubular lagging and projecting radially therefrom, and radially overlapping slip joint portions connecting said connector to said cover and permitting eccentric positionings of said tubular lagging with respect to the opening in said sheath.

2. Lagging means as defined in claim 1 wherein said cover is formed in radially separable complemental sections and slidably fitted into said opening.

3. Lagging means as defined in claim 1 wherein said cover is formed in radially separable complemental sections and the connector is also formed in radially separable complemental sections and is axially slidably overfitted on the tubular lagging.

4. Lagging means as defined in claim 1 wherein said cover is formed in radially separable complemental sections and said slip joint portions comprise radially separable members carried by the cover in axial holding overengagement with coacting portions on the connector.